(12) United States Patent
Takahashi et al.

(10) Patent No.: US 7,643,401 B2
(45) Date of Patent: Jan. 5, 2010

(54) OPTICAL INFORMATION RECORDING MEDIUM AND STAMPER

(75) Inventors: Yusuke Takahashi, Ibaraki (JP);
Katsunori Miyata, Ibaraki (JP);
Masashi Suenaga, Ibaraki (JP); Hitoshi Watanabe, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 642 days.

(21) Appl. No.: 11/376,144

(22) Filed: Mar. 16, 2006

(65) Prior Publication Data

US 2006/0233997 A1    Oct. 19, 2006

(30) Foreign Application Priority Data

Apr. 14, 2005  (JP)  ............................. 2005-117161
Aug. 11, 2005  (JP)  ............................. 2005-232858

(51) Int. Cl.
*G11B 7/24* (2006.01)
(52) U.S. Cl. ............... 369/275.4; 369/274; 347/224
(58) Field of Classification Search ................. 369/273, 369/275.4, 290.1, 275.1, 275.3; 347/224, 347/225
See application file for complete search history.

(56) References Cited

U.S. PATENT DOCUMENTS

| 5,398,231 | A | * | 3/1995 | Shin et al. ................. 369/275.4 |
| 5,608,717 | A | * | 3/1997 | Ito et al. .................... 369/275.3 |
| 5,608,718 | A | * | 3/1997 | Schiewe .................... 369/275.4 |
| 5,748,607 | A | * | 5/1998 | Ohira et al. ............... 369/275.4 |
| 6,463,026 | B1 | * | 10/2002 | Anderson ................... 720/719 |
| 6,507,557 | B1 | * | 1/2003 | Ohno et al. ............... 369/275.3 |
| 7,129,968 | B2 | * | 10/2006 | Morishima ................. 347/253 |
| 7,187,645 | B2 | * | 3/2007 | Bigley ..................... 369/290.1 |
| 7,336,293 | B2 | * | 2/2008 | Honda et al. ................ 347/224 |
| 2004/0170114 | A1 | * | 9/2004 | Masuhara et al. ......... 369/275.4 |

FOREIGN PATENT DOCUMENTS

| JP | A-2004-139697 | 5/2004 |
| JP | A 2004-199771 | 7/2004 |
| WO | WO 03/85656 A1 | 10/2003 |

\* cited by examiner

*Primary Examiner*—Tan X Dinh
(74) *Attorney, Agent, or Firm*—Oliff & Berridge, PLC

(57) ABSTRACT

Disclosed is an optical information recording medium having a printable region on a label surface which is extended to a clamping area, and label information such as a name of a manufacturer is printed in the clamping area. The optical information recording medium includes a substrate having label information pits serving as non-recording and non-reproducing pits that are formed in the clamping area and a reflective layer laminated on the label information pits, and a dummy substrate to be attached to the substrate through an adhesive layer formed on the reflective layer. The multiple label information pits are formed substantially in an entire region of the clamping area to display the label information which emerges by linking portions where the label information pits are not formed.

5 Claims, 7 Drawing Sheets

Signal surface

Label surface

Label information (enlarged view)

Signal surface

102 Label information pit

100 Optical information recording medium

FIG. 6A Enlarged view of character information

FIG. 6B Enlarged view of character information forming section

FIG. 6C Signal surface

OPTICAL INFORMATION RECORDING MEDIUM AND STAMPER

BACKGROUND OF THE INVENTION

1. Field of the Invention

The present invention relates to an optical information recording medium, or more specifically, to an optical information recording medium on which label information is recorded.

2. Description of the Related Art

A digital versatile disk (DVD) having a storage capacity several times as large as a compact disk (CD) such as CD-R or CD-RW has been widely used in recent years as an information recording medium for recording images and voices of a movie, for example. Conventionally, such a DVD includes a surface (a printable layer) on which desired information or an image is printable with a printer or the like on a surface (a label surface) provided on the opposite side to an incident side of recording and reproducing light on a dummy substrate (see Patent Document 1). Moreover, there is a proposal for enhancing a commercial value of a DVD with an extended printable region in recent years by extending a printable layer on a label surface to a clamping area that is located on an inner peripheral side of a recording area (a wide label).

(Patent Document 1)

Japanese Unexamined Patent Publication No. 2004-199771 (see column 0017)

Incidentally, DVDs today include about 8 types of recordable DVDs depending on the standard and the recordable speed, which have pigment layers that contain organic coloring compounds. Moreover, including rewritable DVDs having phase change type recording layers, there are around 20 product types in aggregate.

However, a region for allowing image printing is extended to the clamping area close to a center hole in the case of the wide label DVD. Accordingly, a region for recording label information such as a manufacturer of the DVD or a product type previously recorded in the clamping area is substantially reduced. For this reason, DVD manufacturers try to record the label information as inconspicuously as possible for instance in a similar color to backgrounds of printable surfaces, so as not to affect images printed by users.

Under the circumstances, there is a problem that a user of a DVD can hardly distinguish the various types of DVD products and determine a proper DVD at the point of use.

Moreover, the clamping area around the center hole is known as a region on which stress is highly concentrated when fitting the DVD into a drive or detaching the DVD therefrom. For this reason, in the case of the DVD formed by attaching a substrate having a recording and reproducing region to a dummy substrate has a risk of breakage attributable to deterioration in adhesion of the clamping area.

SUMMARY OF THE INVENTION

The present invention has been made to solve the foregoing problems.

Specifically, an object of the present invention is to provide an optical information recording medium configured to extend a printable region on a label surface to a clamping area, which records label information such as a name of manufacturer in a clamping area.

Another object of the present invention is to provide an optical information recording medium having reinforced adhesion strength in the vicinity of a center hole.

Still another object of the present invention is to provide a stamper for the optical information recording medium having the reinforced adhesion strength.

To solve the foregoing problems, the present invention is configured to record label information by use of multiple pit rows formed in a clamping area.

Specifically, the present invention provides an optical information recording medium formed by attaching a substrate to a dummy substrate provided with a printable layer so as to cover portions corresponding to a clamping area and a recording area of the substrate, in which the substrate includes non-recording and non-reproducing pits having predetermined shapes formed in the clamping area, tracking pregrooves formed in the recording area provided on an outer peripheral side of the clamping area, and a reflective layer formed on the pits and the pregrooves.

Here, in the optical information recording medium applying the present invention, label information is displayed by use of multiple pits formed substantially in an entire region of the clamping area. By using this method, it is possible to record necessary label information in the clamping area which has been previously difficult for utilization by a user who uses a wide label type optical information recording medium.

Moreover, in the optical information recording medium applying the present invention, a recording layer and the reflective layer are sequentially formed on surfaces of the pregrooves in the recording area formed on the outer peripheral side of the clamping area, while only the reflective layer is formed on surfaces of the pits in the clamping area. Accordingly, contrast in the clamping area becomes substantially equal to contrast in the recording area.

In addition, the optical information recording medium applying the present invention may further include a character string pit formed in the clamping area for displaying predetermined character information.

Next, the present invention provides an optical information recording medium, which includes a substrate having tracking pregrooves formed in a recording area, pits formed in a clamping area, and a reflective layer formed on the pits and the pregrooves, and a dummy substrate being attached to the substrate through an adhesive layer formed on the reflective layer and having a printable layer formed on a label surface on the opposite side of the adhesive layer so as to cover portions corresponding to the recording area and the clamping area. Here, the multiple pits are formed substantially in an entire region of the clamping area so as to enable display of label information.

Here, in the optical information recording medium applying the present invention, the pits are preferably formed to define predetermined rows in the clamping area, and the label information is preferably formed so as to allow predetermined information to emerge as a result of linking portions where the pits are not formed.

Alternatively, it is possible to form the pits to define predetermined rows in the clamping area, and to form the label information so as to display predetermined information by linking portions where the pits are formed.

Moreover, the optical information recording medium applying the present invention may further include a character string pit for linking the pits formed in the clamping area and for displaying predetermined character information. In this case, the character string pit is preferably formed deeper than the pits.

Meanwhile, the present invention provides an optical information recording medium formed by attaching a dummy substrate onto a recording and reproducing substrate through an adhesive layer, in which the substrate includes a recording area having tracking pregrooves, and a clamping area having a first pit formed shallower than a groove depth of the pregrooves for displaying label information and a second pit for enhancing adhesion to the dummy substrate. Further, the dummy substrate includes a printable layer formed on a label surface on the opposite side to the adhesive layer so as to cover portions corresponding to the recording area and the clamping area.

Here, visibility of label information is ensured by a reflective layer to be directly formed on the first pits and the second pits.

In addition, the present invention provides a stamper for forming a substrate of an optical information recording medium provided with a printable layer covering portions corresponding to a clamping area and a recording area on a label surface, which includes pit indents formed at the portion corresponding to the clamping area and pregroove indents being formed at the portion corresponding to the recording area provided on an outer peripheral side of the clamping area and having a different shape from the pit indents.

Here, it is preferable to form the pit indents substantially in an entire region of the portion corresponding to the clamping area.

According to the present invention, it is possible to record easily visible label information in a clamping area of an optical information recording medium of a wide label type.

DETAILED DESCRIPTION OF THE PREFERRED EMBODIMENTS

Now, the best modes (preferred embodiments) for carrying out the present invention will be described below with reference to the accompanying drawings. It is to be noted, however, that the present invention will not be limited only to the following embodiments, and that various modifications are possible within the scope of the invention. It is also to be noted that the drawings attached hereto are used solely for explaining the concepts of the embodiments and do not reflect actual dimensions or sizes.

An optical information recording medium applying the present invention has a structure of attaching a substrate to a dummy substrate having a printable layer so as to cover portions corresponding to a clamping area and a recording area of the substrate. Here, the substrate includes non-recording and non-reproducing pits having a predetermined shape which are formed in the clamping area, tracking pregrooves which are formed in the recording area provided on an outer peripheral side of the clamping area, and a reflective layer formed on the pits and the pregrooves. Moreover, label information of the optical information recording medium is recorded by use of the multiple non-recording and non-reproducing pits having the predetermined shape and formed in the clamping area. Now, an embodiment of the optical information recording medium will be described below.

(Optical Information Recording Medium)

Figure 1A:
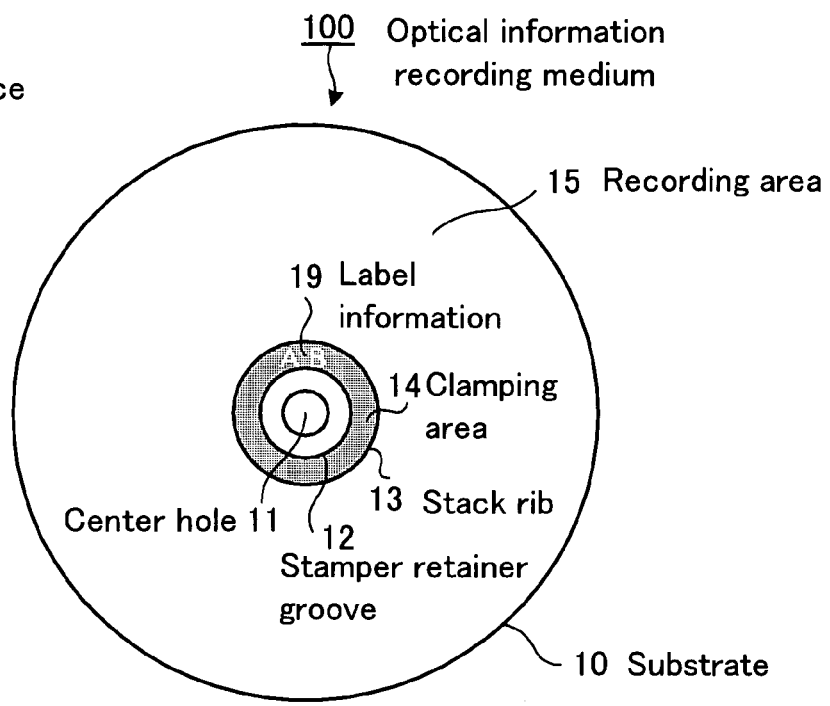
FIGS. 1A and 1B are views for explaining an optical information recording medium applying an embodiment of the present invention.
Figure 1B:
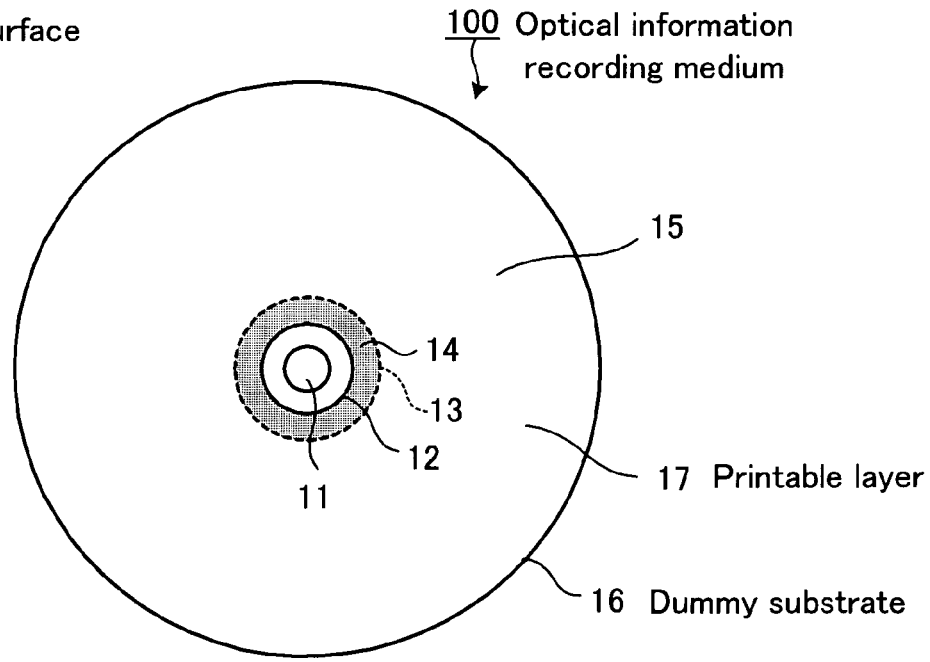

FIGS. 1A and 1B are views for explaining an optical information recording medium applying an embodiment of the present invention. FIG. 1A is a plan view of an optical information recording medium 100 viewed from a signal surface side showing a substrate 10 on which recording and reproducing light is irradiated. FIG. 1B is a plan view of the optical information recording medium 100 viewed from a label surface side showing a dummy substrate 16 having a printable layer 17.

As shown in FIG. 1A, the optical information recording medium 100 includes the discoid substrate 10, and a center hole 11 is formed in the center of the substrate 10. A stamper retainer groove 12 constituting a retainer for a mold in an injection molding process and a stack rib 13 used for fitting the optical information recording medium 100 to a given drive are formed in a concentric manner around the center hole 11. As shown in FIG. 1A, a clamping area 14 is formed on an inner peripheral side of the stack rib 13 and a recording area 15 is formed on an outer peripheral side of the stack rib 13. As it will be described later, label information 19 displayed in the form of AB is recorded in the clamping area 14 by use of multiple label information pit rows serving as non-recording and non-reproducing pits so as to emerge in the clamping area 14.

Next, as shown in FIG. 1B, the dummy substrate 16 is stacked on the substrate 10 on the label surface side of the optical information recording medium 100, in which the printable layer 17 allowing prints with a printer or the like is formed so as to cover the clamping area 14 and the recording area 15.

Next, a layer structure of the optical information recording medium 100 will be described.

Figure 2:
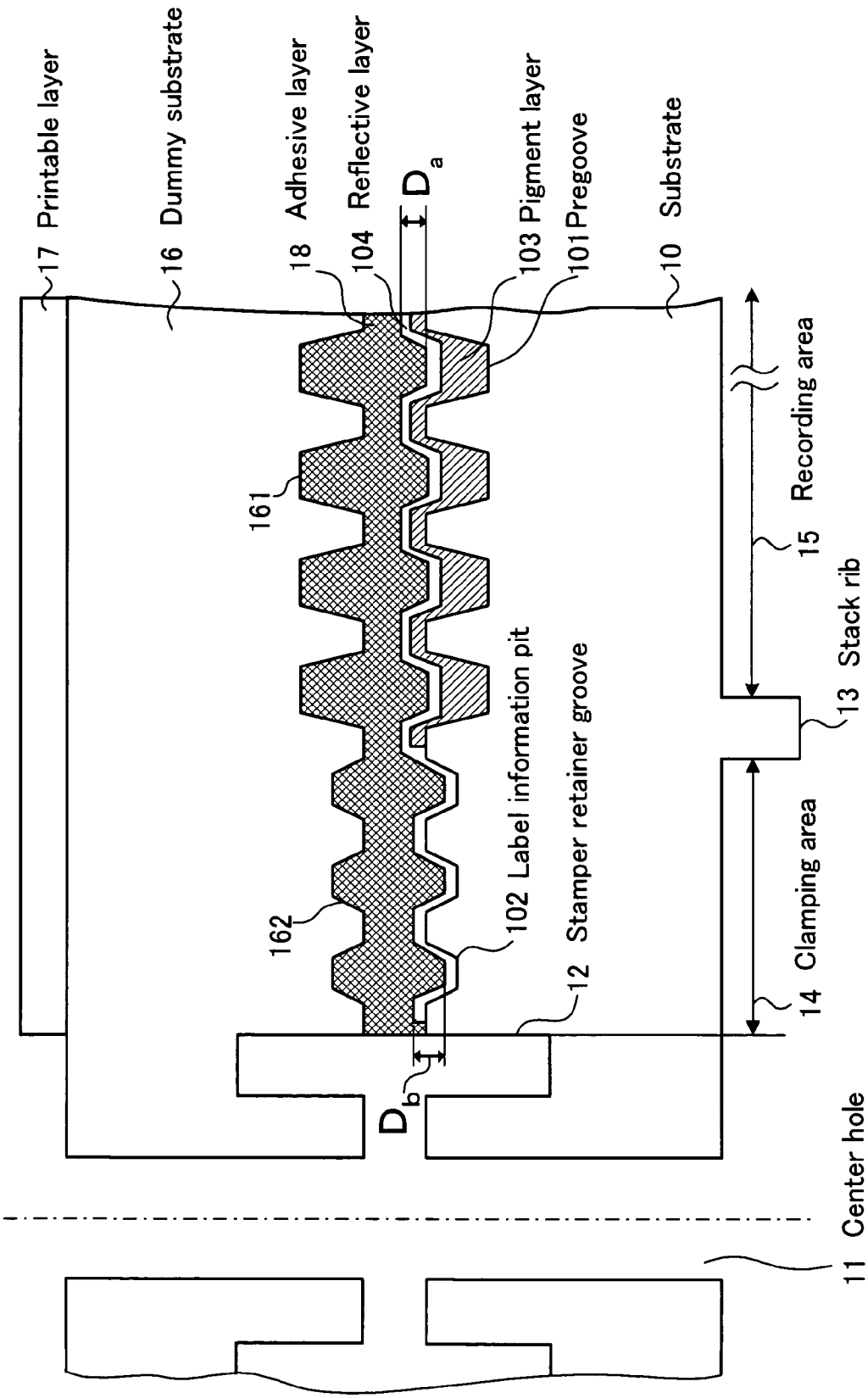
FIG. 2 is a cross-sectional view for explaining a first embodiment of non-recording and non-reproducing pits in the clamping area of the optical information recording medium.

FIG. 2 is a cross-sectional view for explaining a first embodiment of non-recording and non-reproducing pits in the clamping area 14 of the optical information recording medium 100. As shown in FIG. 2, the optical information recording medium 100 has the structure of attaching the substrate 10 made of a light transmissive material and provided with the center hole 11 to the dummy substrate 16 made of the same material as that of the substrate 10 through an adhesive layer 18. Tracking pregrooves 101 having a predetermined shape are formed on a surface of the substrate 10 either in a centric manner or in a spiral manner. Meanwhile, pre-pits recording information or predetermined patterns for a tracking or addressing purpose are provided as appropriate in the recording area 15 extending from the stack rib 13 to the outer peripheral side.

In the clamping area 14 on the surface of the substrate 10, multiple label information pits 102 serving as non-recording and non-reproducing pits are formed in a range up to the stamper retainer groove 12 on the inner peripheral side, and given label information is recorded therein. Here, the label information pits 102 serving as the non-recording and non-reproducing pits have a different shape from the shape of the pregrooves 101 that are formed in the recording area 15.

A pigment layer 103 containing an organic coloring compound, and a reflective layer 104 are sequentially laminated on the pregrooves 101 formed in the recording area 15. Meanwhile, only the reflective layer 104 is provided on the label information pits 102 formed in the clamping area 14.

The printable layer 17 is provided on a surface of the dummy substrate 16 so as to cover the clamping area 14 and the recording area 15 of the substrate 10, whereby given images can be printed thereon by use of a printer or the like. Grooves 161 having the same shape as that of the pregrooves 101 that are formed on the surface of the substrate 10, and pits 162 having the same shape as that of the label information pits 102 are formed on the other surface of the dummy substrate 16 facing the adhesive layer 18.

(Label Information)

In the optical information recording medium 100 applying this embodiment, the label information 19 which is formed by use of multiple rows of the label information pits 102 serving as the non-recording and non-reproducing pits is recorded in the clamping area 14 on the surface of the substrate 10.

Figure 3A:
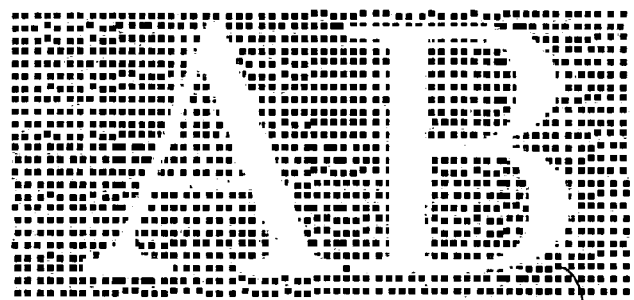
FIGS. 3A and 3B are views for explaining the label information recorded in the clamping area.
Figure 3B:
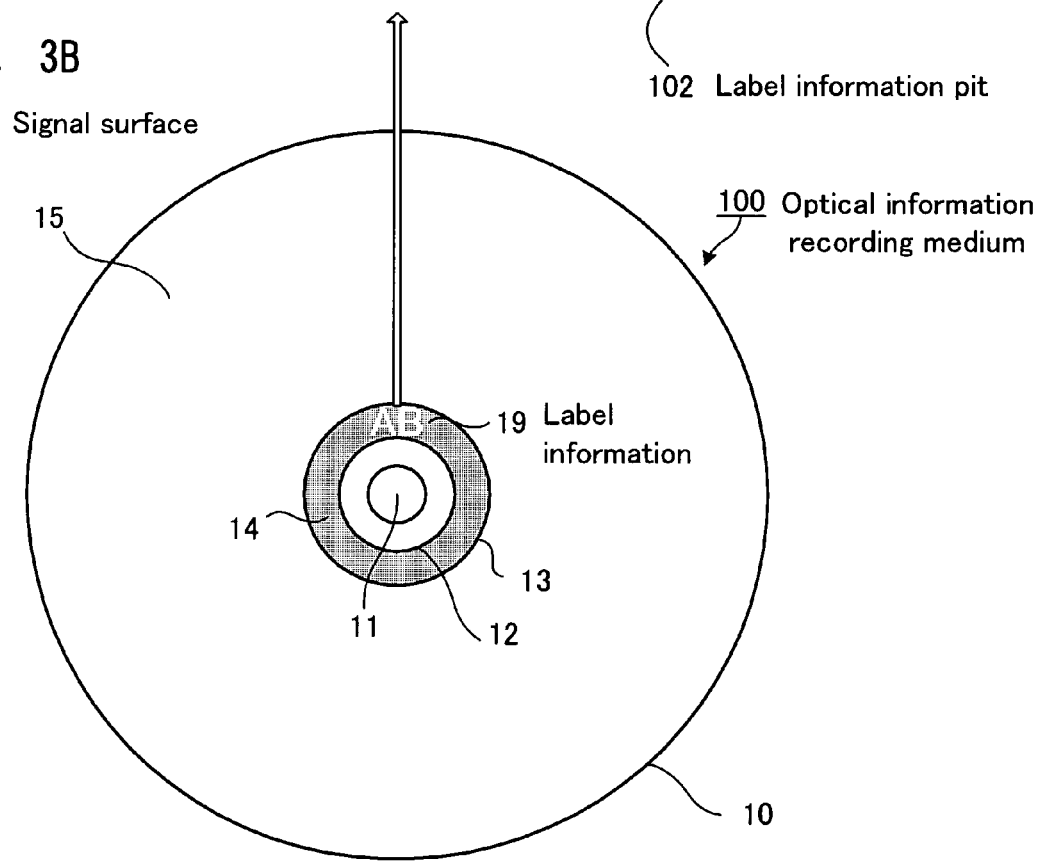

FIGS. 3A and 3B are views for explaining the label information recorded in the clamping area 14. As shown in FIG. 3B, the label information 19 displayed in the form of AB is recorded in the clamping area 14 by use of multiple rows of the label information pits 102.

FIG. 3A is an enlarged view for explaining the label information 19. As shown in FIG. 3A, the multiple label information pits 102 are formed so as to define predetermined rows and portions where the label information pits 102 are not formed are linked together, whereby character information of AB emerge. Here, the label information pits 102 are illustrated as black dot patterns.

As another embodiment of recording the label information 19 in the clamping area 14, a method configured to form multiple label information pits 102 along the shape of the character information AB and to record the character information AB by linking portions where the label information pits 102 are formed, is conceivable.

In this case, it is preferable to provide multiple second pits (not shown) in the clamping area 14 in addition to the label information pits 102 used for recording the label information 19 in light of enhancement of adhesion between the substrate 10 and the dummy substrate 16. The number of the second pits is not particularly limited and should be appropriately selected in relation to the number of the label information pits 102.

Moreover, in the optical information recording medium 100 applying this embodiment, the shape of the label information pits 102 formed in the clamping area 14 is different from the shape of the pregrooves 101 formed in the recording area 15. Specifically, the depth of the label information pits 102 is formed shallower than the depth of the pregrooves 101.

As it will be described later, when the pigment layer 103 containing the organic coloring compound is formed on the surface of the pregroove 101, the organic coloring compound stays in the pregroove 101 after formation of the pigment layer 103. Accordingly, the shape of a recess on a surface of the pigment layer 103 becomes approximately equal to the shape on a surface of the label information pit 102 not having the pigment layer 103 thereon.

As the shape of the recess on the surface of the pigment layer 103 becomes approximately equal to the shape of the label information pit 102 not having the pigment layer 103 thereon, shapes of recesses in the clamping area 14 and the recording area 15 after forming the reflective layer 104 on these surfaces also become approximately equal to one another.

That is, a depth (Da) and a half width (Wa) of the recess when providing the reflective layer 104 on the surface of the pigment layer 103 in the recording area 15 are approximately equal to a depth (Db) and a half width (Wb) of the recess when providing the reflective layer 104 on the surface of the label information pit 102 in the clamping area 14, respectively.

As a result, amounts of light reflection become substantially equal between the clamping area 14 and the recording area 15, whereby a boundary between an image printed at a portion corresponding to the clamping area 14 on the printable layer 17 and an image printed at a portion corresponding to the recording area 15 on the printable layer 17 is inconspicuous. In this way, it is possible to solve a problem that an image printed on the printable layer 17 seemingly contains a boundary.

Note that the method of forming the shape of the label information pit 102 approximately equal to the shape of the recess on the surface of the pigment layer 103 after formation is not limited only to the foregoing configuration. For example, a method configured to measure a shape after forming the pigment layer 103 on the pregroove 101 in the recording area 15 in advance and to determine the shape of the label information pit 102 based on the measure shape, is also conceivable.

Moreover, in the optical information recording medium 100 applying this embodiment, the pigment layer 103 containing the organic coloring compound is not formed on the surfaces of the label information pits 102 that are formed in the clamping area 14 on the surface of the substrate 10.

Specifically, since the pigment layer 103 is not formed on the surfaces of the label information pits 102 in the vicinity of the center hole 11, it is possible to enhance adhesion between the substrate 10 and the dummy substrate 16 in the clamping area 14 where stress is highly concentrated. As a result, it is possible to prevent damage in the vicinity of the center hole 11 when loading or removing the optical information recording medium 100 into and from a drive.

Furthermore, in this embodiment, it is possible to enhance adhesion of the dummy substrate 16 by forming the grooves 161 having the same shape as the shape of the pregrooves 101 formed on the surface of the substrate 10 as well as the pits 162 having the same shape as the shape of the label information pits 102 on the surface of the dummy substrate 16 facing the adhesive layer 18. Particularly, since the pits 162 having the same shape as the shape of the label information pits 102 on the substrate 10 are formed on the dummy substrate 16 in the range corresponding to the clamping area 14 of the substrate 10, it is possible to further enhance adhesion between the substrate 10 and the dummy substrate 16 in the clamping area 14 where the stress is highly concentrated.

(Layer Constituent Materials)

Next, materials of the respective layers constituting the optical information recording medium 100 applying the present invention will be described.

The substrate 10 is made of a light transmissive material. For example, the light transmissive material may be synthetic resin such as polycarbonate resin, polymethylmethacrylate resin, epoxy resin or ABS resin, glass, and the like. Among these materials, polycarbonate resin, polymethylmethacrylate resin, and the like are preferred in light of ease of handling.

The pigment layer 103 can be formed by coating a pigment solution, which is prepared by dissolving the organic coloring compound into a given solvent, on the pregrooves 101 formed in the recording area 15 of the substrate 10 in accordance with a spin coating method or the like. For example, the organic coloring compound may be a cyanine dye, a squarylium dye, a chroconium dye, an azulenium dye, a triarylamine dye, anthraquinone dye, a metal-containing azo dye, a dithiol metal complex salt dye, an indoaniline metal complex dye, a phthalocyanine dye, a naphthalocyanine dye, and the like. These materials may be used either individually or in combination.

Meanwhile, the solvent used for preparing the pigment solution may be ethyl cellosolve, methyl cellosolve, methanol, tetrafluoropropanol, and the like. Here, in addition to the organic coloring compound, the pigment layer 103 may also include: a quencher such as an antioxidant or a dithiol complex; a binder such as nitrocellulose, cellulose acetate, ketone resin, acrylic resin, polyvinyl butyral or polyolefin; and the like.

The reflective layer 104 may be formed by use of metal such as Au, Ag, Cu, Ni, Al or Pt or an alloy thereof in accordance with a vacuum vapor deposition method, a sputtering method, an ion plating method or the like. Among these materials, Ag and Al are particularly preferred.

The adhesive layer 18 may be formed by coating an adhesive on the reflective layer 104 in accordance with spin coating, gravure coating, spray coating, and roll coating methods, for example. For example, the adhesive may be ultraviolet curing acrylic resin, ultraviolet curing epoxy resin, an ultraviolet curing adhesive, an epoxy adhesive, silicone resin, a silicone adhesive, a hot melt adhesive, and the like.

The dummy substrate 16 is preferably made of the same material as that of the substrate 10. By forming the dummy substrate 16 and the substrate 10 with the same material, it is possible to prevent warpage of the disk after attaching these constituents together.

The printable layer 17 is formed by coating an aqueous solution containing ultraviolet curing resin onto the dummy substrate 16 and then curing the resin by irradiation of ultraviolet rays. For example, the ultraviolet curing resin may be acrylate resin such as hydroxyethyl(meth)acrylate, hydroxypropyl(meth)acrylate, hydroxybutyl(meth)acrylate, hydroxypentyl(meth)acrylate, phenoxyhydroxypropyl (meth)acrylate, chlorohydroxypropyl(meth)acrylate, diethylene glycol mono(meth)acrylate, triethylene glycol mono (meth)acrylate, polyethylene glycol mono(meth)acrylate, dipropylene glycol mono(meth)acrylate, polypropylene glycol mono(meth)acrylate, glycerin mono(meth)acrylate, glycerin di(meth)acrylate, pentaerythritol(meth)acrylate, phenylglycidylether(meth)acrylate, dipentaerythritol penta (meth)acrylate, di(meth)acrylate of bisphenol A epoxy resin, and the like.

For example, a cross-linking monomer to be added to any of the foregoing resin may be trimethylolpropane tri(meth) acrylate, acrylated isocyanurate, 1,4-butanediol di(meth) acrylate, 1,6-hexanediol di(meth)acrylate, neopentyl glycol di(meth)acrylate, dicyclopentadienyl di(meth)acrylate, pentaerythritol tetra(meth)acrylate, and the like.

For example, a radical initiator to be used for a curing reaction may be an acetophenone initiator such as 1-hydroxycyclohexylphenylketone, 2-hydroxy-2-methyl-1-phenylpropane-1-on or 2,2-diethoxyacetophenone, 4-phenoxy-2,2-dichloroacetophenone, a propiophenone initiator such as 2-hydroxy-2-methylpropiophenone, an anthraquinone initiator such as 2-chloroanthraquinone or a thioxanthone initiator such as 2,4-diethylthioxanthone.

(Stamper)

Next, a stamper for forming the substrate 10 will be described.

A stamper applying this embodiment is a stamper for molding the substrate 10 to be attached to the dummy substrate 16 not including a recording and reproducing region and thereby to constitute the optical information recording medium 100. Here, the stamper includes pregroove indents formed at a portion corresponding to the recording area 15 of the substrate 10, and a label information pit indents formed at a portion corresponding to the clamping area 14.

Here, each label information pit indent is preferably formed to have a smaller height of the indent as compared to that of the pregroove indent, and thereby to render the depth of the label information pits 102 to be formed in the clamping area 14 shallower than the depth of the pregrooves 101 to be formed in the recording area 15.

Moreover, the number of the label information pit indents does not have any particular limitations and is therefore appropriately determined so that the multiple label information pits 102 are formed substantially on the entire surface in the clamping area 14. Formation of the multiple label information pits 102 substantially on the entire surface in the clamping area 14 of the substrate 10 is preferable in terms of improvement in adhesion between the substrate 10 and the dummy substrate 16 in the clamping area 14.

A method of manufacturing the stamper is not particularly limited and any publicly-known method is applicable. However, the following method is conceivable, for example.

Specifically, a laser beam is irradiated on a glass original plate coated with photoresist to form land/groove latent images. Then, the glass original plate is exposed to a developer to elicit a photoresist pattern. Subsequently, the glass original plate is subjected to a reactive ion etching process while using the photoresist pattern as an etching mask, and then the photoresist remaining on the surface of the glass original plate is removed. In this way, the photoresist pattern is transferred on the glass original plate.

Next, a surface of the glass original plate thus prepared is subjected to a radial etching process, and then a conductive film is formed on the surface of the glass original plate. Then, nickel electroplating is conducted, and a nickel layer is peeled off from the glass original substrate having the photoresist pattern thereon. In this way, the stamper is prepared.

Thereafter, the substrate having the photoresist pattern on the surface is obtained by use of the stamper thus prepared and in accordance with an injection molding method or the like.

(Second Embodiment of Non-Recording and Non-Reproducing Pits)

Next, a second embodiment of the non-recording and non-reproducing pits will be described.

Figure 4:
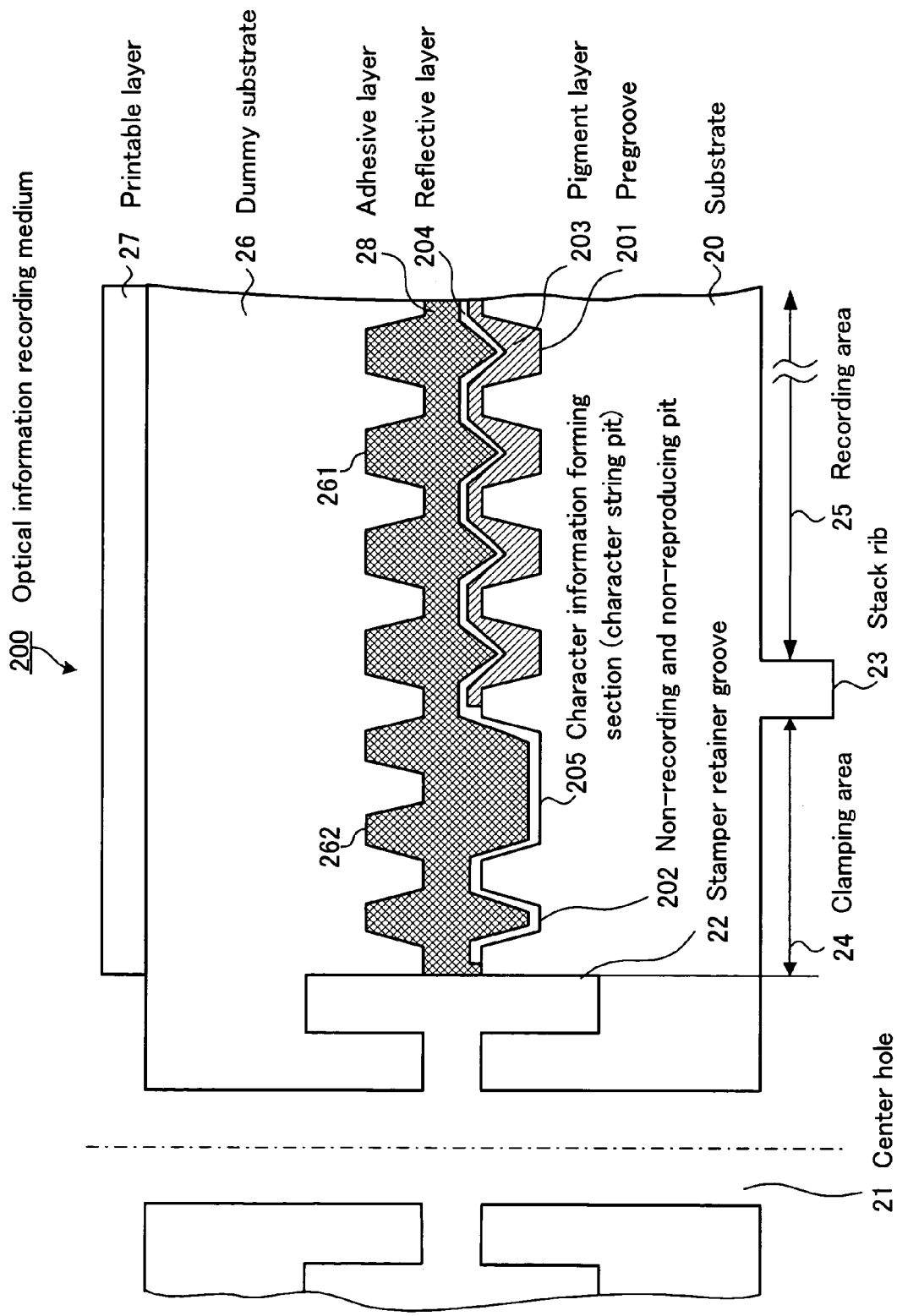
FIG. 4 is a cross-sectional view for explaining non-recording and non-reproducing pits according to the second embodiment and a character information forming section (a character string pit)

FIG. 4 is a cross-sectional view for explaining non-recording and non-reproducing pits 202 according to the second embodiment which are formed in a clamping area 24 of an optical information recording medium 200 applying the present invention and for explaining a character information forming section (a character string pit). An example of a resist type DVD-R having a wide printable shape is illustrated herein.

As shown in FIG. 4, the optical information recording medium 200 is formed by attaching a substrate 20 provided with a center hole 21 to a dummy substrate 26 through an adhesive layer 28. Pregrooves 201 are formed on a surface of the substrate 20. Moreover, predetermined patterns are provided as appropriate in a recording area 25 extending from a stack rib 23 to the outer peripheral side. In the clamping area 24 on the surface of the substrate 20, the non-recording and non-reproducing pits 202 are formed in rows at a predetermined constant pitch in a range up to a stamper retainer groove 22 on an inner peripheral side, and a character information forming section (a character string pit) 205 for linking the multiple non-recording and non-reproducing pits 202 and for displaying character information is also formed. A pigment layer 203 and a reflective layer 204 are sequentially laminated on the pregrooves 201. Meanwhile, only the reflective layer 204 is provided on the non-recording and non-reproducing pits 202. A printable layer 27 is provided on a surface of the dummy substrate 26 so as to cover the clamping area 24 and the recording area 25 of the substrate 20. Grooves 261 having the same shape as that of the pregrooves 201 that are formed on the surface of the substrate 20, and pits 262 having the same shape as that of the non-recording and non-reproducing pits 202 are formed on the other surface of the dummy substrate 26 facing the adhesive layer 28.

As shown in FIG. 4, each of the non-recording and non-reproducing pits 202 formed in the clamping area 24 has a depth to a bottom that is as large as a depth to a bottom of each of the pregrooves 201 formed in the recording area 25. As described previously, the pigment layer 203 and the reflective layer 204 are sequentially laminated on the pregrooves 201, whereas only the reflective layer 204 is provided on the non-recording and non-reproducing pits 202. Therefore, a depth of a recess on the reflective layer 204 provided on the pregroove 201 is slightly different from a depth of a recess on the reflective layer 204 provided on the non-recording and on-reproducing pit 202.

The character information forming section (the character string pit) 205 formed in the clamping area 24 links a plurality (equal to 2 rows in this example) of the non-recording and non-reproducing pits 202 that form the rows at the predetermined constant pitch (approximately 0.74 μm in this embodiment), and displays character information such as label information. The method of forming the character information forming section (the character string pit) 205 usually applies the previously mentioned manufacturing method of the stamper associated with a double exposure process. Here, upon formation of the latent image of the predetermined pattern by irradiation of a laser beam on the glass original plate coated with the photoresist, the portion of the glass original plate corresponding to the non-recording and non-reproducing pits 202 is subjected to exposure in the first place, and then the portion corresponding to the character information forming section (the character string pit) 205 is subjected to exposure again.

(Third Embodiment of Non-Recording and Non-Reproducing Pits)

Next, a third embodiment of the non-recording and non-reproducing pits will be described.

Figure 5:
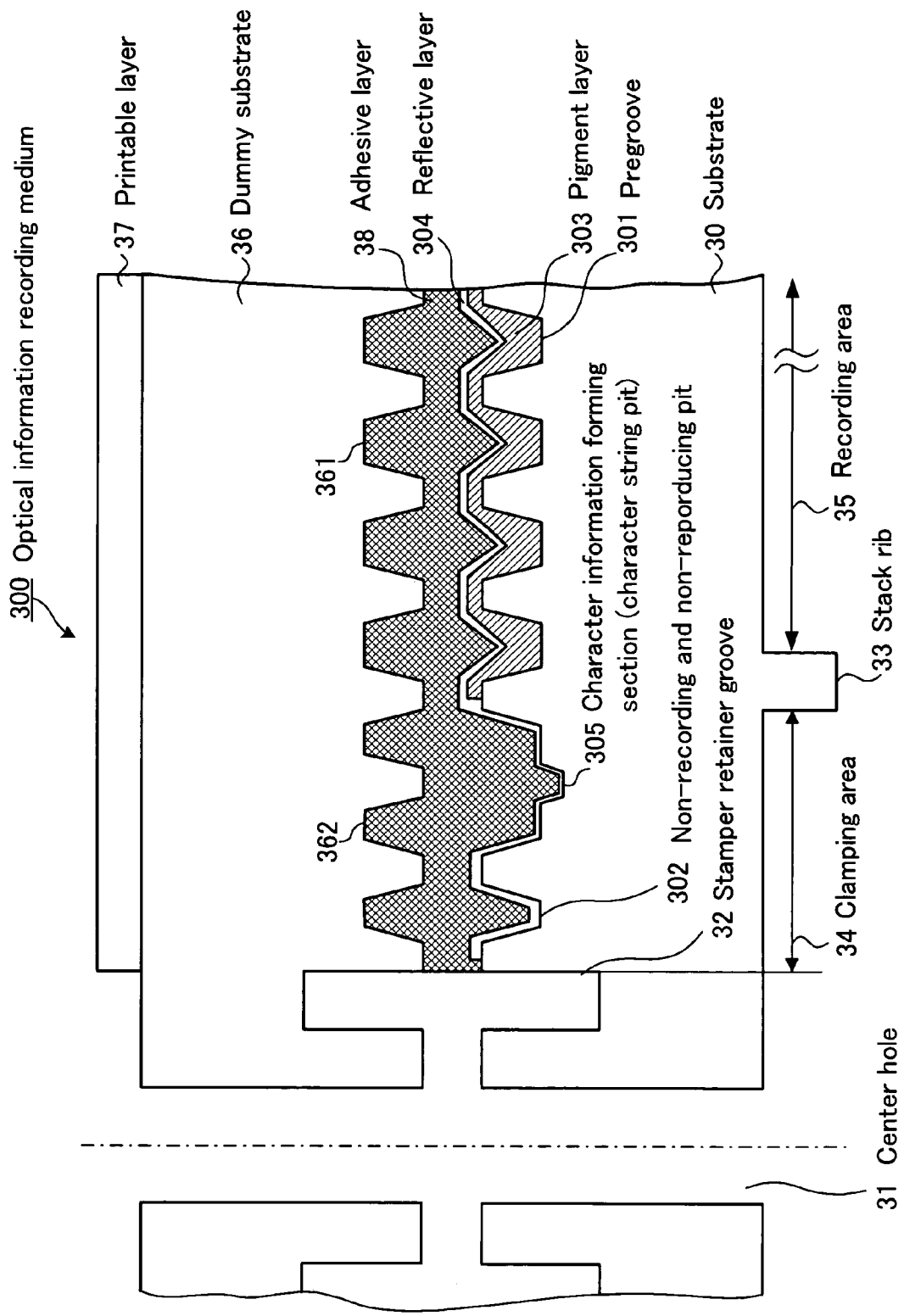
FIG. 5 is a cross-sectional view for explaining non-recording and non-reproducing pits according to the third embodiment and a character information forming section (a character string pit)

FIG. 5 is a cross-sectional view for explaining non-recording and non-reproducing pits 302 according to the third embodiment and a character information forming section (a character string pit) in an optical information recording medium 300 applying this embodiment. An example of an emboss type DVD-R having a wide printable shape is illustrated herein.

As shown in FIG. 5, an optical information recording medium 300 is formed by attaching a substrate 30 provided with a center hole 31 to a dummy substrate 36 through an adhesive layer 38. Pregrooves 301 are formed on a surface of the substrate 30. Moreover, predetermined patterns are provided as appropriate in a recording area 35 extending from a stack rib 33 to the outer peripheral side. Non-recording and non-reproducing pits 302 and a character information forming section (a character string pit) 305 are formed in a range of a clamping area 34 up to a stamper retainer groove 32. A pigment layer 303 and a reflective layer 304 are sequentially laminated on the pregrooves 301. Meanwhile, only the reflective layer 304 is provided on the non-recording and non-reproducing pits 302. Here, a printable layer 37 is provided on a surface of the dummy substrate 36 so as to cover the clamping area 34 and the recording area 35 of the substrate 30. Grooves 361 having the same shape as that of the pregrooves 301 that are formed on the surface of the substrate 30, and pits 362 having the same shape as that of the non-recording and non-reproducing pits 302 are formed on the other surface of the dummy substrate 36 facing the adhesive layer 38.

As shown in FIG. 5, each of the non-recording and non-reproducing pits 302 has a depth to a bottom that is as large as a depth to a bottom of each of the pregrooves 301. The pigment layer 303 and the reflective layer 304 are sequentially laminated on the pregrooves 301, whereas only the reflective layer 304 is provided on the non-recording and non-reproducing pits 302. Therefore, a depth of a recess on the reflective layer 304 provided on the pregroove 301 is different from a depth of a recess on the reflective layer 304 provided on the non-recording and on-reproducing pit 302.

The character information forming section (the character string pit) 305 formed in the clamping area 34 links a plurality (2 rows in this example) of the non-recording and non-reproducing pits 302 that form the rows at a predetermined constant pitch (approximately 0.74 μm in this embodiment), and displays character information such as label information. In addition, a groove deeper than a bottom part of the non-recording and non-reproducing pits 302 is formed at the bottom of the character information forming section (the character string pit) 305. By forming the deeper groove at the bottom of the character information forming section (the character string pit) 305, it is possible to enhance contrast of the character information to be displayed by use of the character information forming section (the character string pit) 305.

(Character Information)

Figure 6:
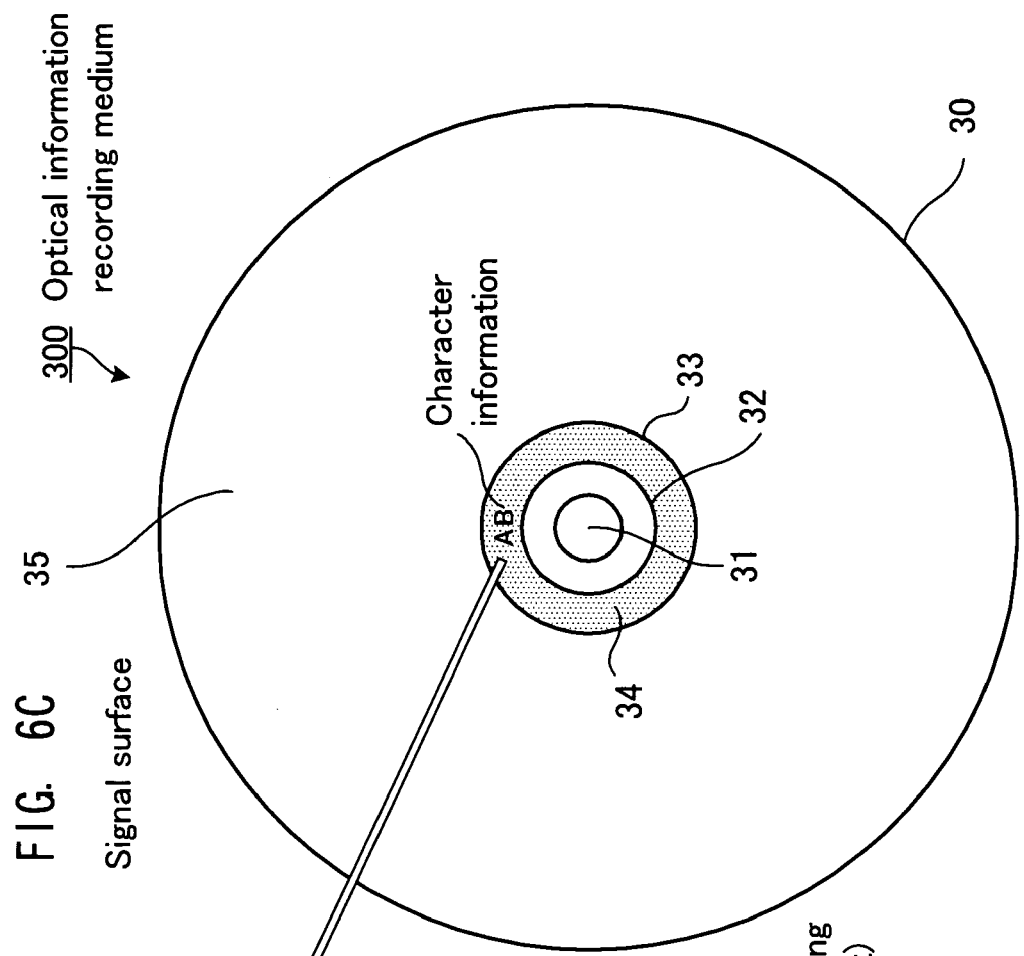
FIGS. 6A to 6C are views for explaining the character information displayed by use of the character information forming section (the character string pit)

FIGS. 6A to 6C are views for explaining the character information displayed by use of the character information forming section (the character string pit). Here, the drawings illustrate the example of the character information displayed in the clamping area of the DVD-R shown in FIG. 5.

FIG. 6A is an enlarged view of the character information formed in the clamping area 34 of the optical information recording medium 300. As shown in FIG. 6A, the character information ("AB" in this case) is displayed in the clamping area 34 by use of the character information forming section (the character string pit) 305 together with the non-recording and non-reproducing pits 302 (which are illustrated as black dot patterns herein) that define rows at a predetermined constant pitch.

FIG. 6B is an enlarged view of the character information forming section (the character string pitch) 305. As shown in FIG. 6B, the character information forming section (the character string pit) 305 is formed so as to link the multiple non-recording and non-reproducing pits 302 and thereby to display the character information.

FIG. 6C is a plan view of the optical information recording medium 300 viewed from a signal surface thereof. As shown in FIG. 6C, the character information (AB) is formed by use of the character information forming section (the character string pit) 305 so as to emerge in the clamping area 34 where the non-recording and non-reproducing pits 302 are formed to define the rows at the constant pitch.

EXAMPLE

The embodiment of the present invention will be described further in detail based on a certain example. It is to be noted, however, that the present invention will not be limited only to the following example.

Example

A discoid substrate having a thickness of 0.6 mm, an outside diameter of φ 120 mm, an inner diameter (a diameter of a center hole) of φ 15 mm, and a refractive index of 1.59 is molded by performing injection molding of polycarbonate resin by use of a given stamper.

A stamper retainer groove is formed on the molded substrate in a position corresponding to a diameter of φ 21 mm. In a clamping area defined in a diametrical range from φ 22 mm to φ 34 mm outside the stamper retainer groove, label information pits having a shallower depth than a depth of grooves formed in a recording area are formed as non-recording and non-reproducing pits. The label information pits are provided so as to allow multiple recesses to form predetermined rows, whereby character information emerges by linking portions where the recesses are not formed. Moreover, pregrooves having a predetermined depth are formed in the recording area which is provided outside the clamping area.

The pregrooves formed in the recording area have dimensions of a track pitch of 0.74 μm, a depth of 160 nm, and a half width of 310 nm. The label information pits formed in the clamping area have dimensions of a track pitch of 0.74 μm a depth of 100 nm, and a half width of 250 nm.

Next, an azo dye solution (at a concentration equal to 1.2% by weight) is coated in accordance with the spin coating method only in the recording area on the pregrooves formed on the substrate, or in a region from a diameter of about 36 mm outward to form a pigment layer. The pigment stays in the pregrooves after coating the pigment layer, whereby the shape of each recess on a surface of the pigment layer has dimensions of a depth of 100 nm and a half width of 250 nm.

Subsequently, an Ag alloy is sputtered onto the surface of the substrate in a diametrical range from φ 22 mm to φ 119 mm so as to cover both of the clamping area and the recording area. In this way, a reflective layer is formed in a thickness of 100 nm on the pigment layer formed in the recording area and on the label information pits in the clamping area.

The reflective layer formed by sputtering retains the uniform thickness. Accordingly, the label information pit in the clamping area provided with the reflective layer has a depth (Db) of 100 nm which is equal to the depth of the label information pit before providing the reflective layer, and a half width (Wb) of 250 nm which is equal to the half width before providing the reflective layer. Similarly, the recess on the surface of the pigment layer in the recording area provided with the reflective layer has a depth (Da) of 100 nm which is equal to the depth of the recess before providing the reflective layer, and a half width (Wa) of 250 nm which is equal to the half width before providing the reflective layer.

Subsequently, an adhesive layer is formed by coating ultraviolet curing resin in a thickness of 10 μm in accordance with the spin coating method so as to cover the reflective layer formed in the clamping area and the recording area.

Then, a dummy substrate having grooves in the same shape as that of the pregrooves and grooves in the same shape as that of the label information pits on the substrate is prepared by performing injection molding of polycarbonate resin. The prepared dummy substrate has a thickness of 0.6 mm.

Subsequently, the prepared dummy substrate is placed on the above-described adhesive layer provided on the substrate so as to allow the grooves formed on the dummy substrate to face the adhesive layer. Thereafter, the dummy substrate and the substrate thus stacked are rotated at a high speed to remove the excess ultraviolet curing resin. Then, the ultraviolet curing resin is cured by irradiation of ultraviolet rays. In this way, an optical information recording medium is prepared by attaching the substrate including a recording layer to the dummy layer not including the recording layer.

A refractive index of the hardened ultraviolet curing resin is approximately equal to the refractive index of the dummy substrate made of polycarbonate resin. Therefore, the thickness of the dummy substrate becomes uniform even when the grooves are formed on the surface of the dummy substrate facing the adhesive layer. Accordingly, these grooves do not adversely affect light reflection. For this reason, the pregrooves and the label information pits do not overlap visually.

Next, a white protective layer is formed on the other surface (the label surface side) of the dummy substrate without the grooves in a range from a diameter of 21 mm outward in accordance with a screen printing method, a knife coat printing method, a spin coating method or the like.

Meanwhile, an ultraviolet curing type aqueous coating solution is prepared by mixing 14 parts of polyvinyl alcohol (made by Nippon Synthetic Chemical Industry Co., Ltd.: Product name "EG-05", saponification degree 86.5% to 89.0%), 5.7 parts of polyoxyethylene (400) diacrylate (made by Kyoeisha Chemical Co., Ltd: Product name "LIGHT-ACRYLATE 9EG-A"), 0.3 parts of a photopolymerization initiator (made by CIBA Specialty Chemicals: Product name "IRGACURE 2959"), and 80 parts of water.

Next, the aqueous coating solution thus prepared in advance is coated on the white protective layer formed on the dummy substrate in accordance with a spin coating method, and then the aqueous coating solution is cured by irradiation of ultraviolet rays at 500 mJ/cm$^2$ to form an ink acceptance layer having a film thickness of 20 μm. The above-described white protective layer and the ink acceptance layer collectively constitute a printable layer. The printable layer is provided on the entire label surface of the dummy substrate so as to cover the clamping area of the optical information recording medium. Here, conditions of the spin coating method are configured to drop about 10 ml of the aqueous coating solution onto an inner periphery of the white protective layer, to coat the solution on the entire coating surface at revolutions of 1000 rpm, and to raise the revolutions to 2000 rpm to drain the excess aqueous coating solution. Thereafter, an image is printed on the printable layer thus prepared on the dummy substrate by use of an inkjet printer.

Label information recorded in the clamping area by use of the multiple rows of the label information pits is observed from the signal surface side of the optical information recording medium. The label information is clearly observed and a display region for the label information is successfully ensured.

Moreover, the recording layer is not formed at the portion of the multiple label information pits formed in the clamping area of the substrate. In addition, the grooves having the same shape as that of the label information pits are also formed at the portion corresponding to the clamping area of the dummy substrate. Accordingly, a surface area in terms of the adhesive layer is increased when attaching the substrate to the dummy substrate through the adhesive layer. In this way, adhesion strength between the substrate and the dummy substrate is successfully enhanced.

Furthermore, as a result of visual observation of the printed image from the label surface side, no boundaries are observed between a portion of the image printed in the recording area and a portion of the image printed in the clamping area. In this way, the problem that the image printed on the printable layer seemingly contains a boundary is eliminated.

In this example, the half width (Wb) of the label information pit in the clamping area when providing the reflective layer on the substrate is set equal (250 nm) to the half width (Wa) of the recess on the surface of the pigment layer on the pregroove in the recording area provided with the reflective layer. However, the present invention is not limited only to this configuration.

Specifically, when these half widths have different values, it is also possible to adjust a proportion between the track pitch and the half width by appropriately changing the track pitch of the label information pits to be formed in the clamping area. For example, it is possible to adjust the proportion so as to maintain a relation expressed as (Wa/track pitch a)≦ (Wb/track pitch b). It is possible to set light reflection to a good condition upon a visual check of the label surface by appropriately adjusting this proportion.

Although this example explains the case where the depth of the grooves of the label information pits formed in the clamping area is smaller than the depth of the grooves formed in the recording area, the embodiment of the present invention is not limited only to this example in terms of the depth of the grooves of the label information pits, and various modifications are possible herein.

Figure 7:
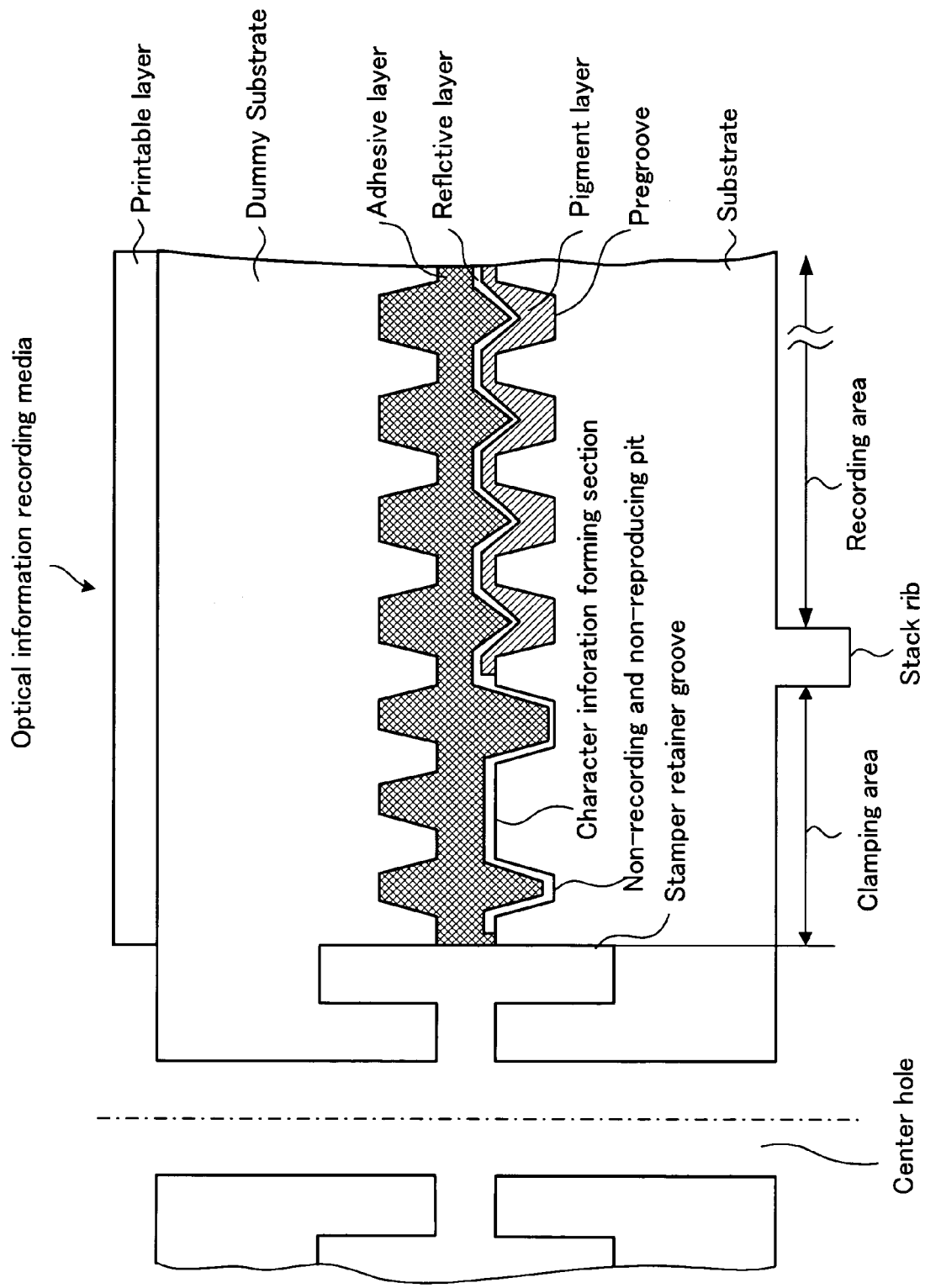
FIG. 7 is a view for explaining an optical information recording medium configured to set the depth of the grooves of the non-recording and non-reproducing pits formed in the clamping area equal to the depth of the pregrooves formed in the recording area.

For example, FIG. 7 is a view for explaining an optical information recording medium configured to set the depth of the grooves of the non-recording and non-reproducing pits formed in the clamping area equal to the depth of the pregrooves formed in the recording area. As shown in FIG. 7, in this optical information recording medium, the depth of the grooves of the non-recording and non-reproducing pits formed in the clamping area of the substrate is set equal to the depth of the pregrooves formed in the recording area. Here, the non-recording and non-reproducing pits are formed such that multiple recesses define predetermined rows. Moreover, the characteristic information forming section, where the character information emerges, is formed by linking portions in the clamping area of the substrate where the recesses are not formed.

What is claimed is:

1. An optical information recording medium formed by attaching a substrate to a dummy substrate,
    the substrate comprising:
        non-recording and non-reproducing pits having predetermined shapes formed substantially in an entire region of a clamping area;
        tracking pregrooves formed in a recording area provided on an outer peripheral side of the clamping area; and
        a reflective layer formed on the non-recording and non-reproducing pits and the tracking pregrooves, and
    the dummy substrate comprising a printable layer formed to cover portions corresponding to the clamping area and the recording area of the substrate, wherein:
    label information is displayed by use of a plurality of the non-recording and non-reproducing pits, and
    contrast in the entire region of a clamping area becomes substantially equal to contrast in the recording area.

2. The optical information recording medium according to claim 1,
    wherein a recording layer and the reflective layer are sequentially formed on surfaces of the tracking pregrooves in the recording area, and
    only the reflective layer is formed on surfaces of the non-recording and non-reproducing pits in the clamping area.

3. The optical information recording medium according to claim 1, further comprising:
    a character string pit formed in the clamping area for displaying predetermined character information.

4. The optical information recording medium according to claim 3,
    wherein the character string pit is formed deeper than the non-recording and non-reproducing pits.

5. The optical information recording medium according to claim 1,
    wherein the non-recording and non-reproducing pits are formed shallower than a groove depth of the tracking pregrooves.

* * * * *